United States Patent
Davydok et al.

(10) Patent No.: US 8,601,007 B2
(45) Date of Patent: Dec. 3, 2013

(54) NET CHANGE NOTIFICATION BASED CACHED VIEWS WITH LINKED ATTRIBUTES

(75) Inventors: Dmitri Davydok, Bellevue, WA (US); Praveen Upadhyay, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 155 days.

(21) Appl. No.: 13/109,486

(22) Filed: May 17, 2011

(65) Prior Publication Data
US 2012/0296889 A1    Nov. 22, 2012

(51) Int. Cl.
*G06F 7/00*    (2006.01)

(52) U.S. Cl.
USPC ......................................................... 707/754

(58) Field of Classification Search
None
See application file for complete search history.

(56) References Cited

U.S. PATENT DOCUMENTS

| | | | |
|---|---|---|---|
| 5,504,887 A * | 4/1996 | Malhotra et al. ...................... | 1/1 |
| 6,587,849 B1 * | 7/2003 | Mason et al. ......................... | 1/1 |
| 7,051,041 B1 * | 5/2006 | Miller .................................. | 1/1 |
| 8,280,881 B1 * | 10/2012 | Zhou et al. ..................... | 707/728 |
| 2002/0143749 A1 * | 10/2002 | Hartel et al. ....................... | 707/3 |
| 2003/0014462 A1 * | 1/2003 | Bennett et al. ................. | 709/100 |
| 2003/0131142 A1 * | 7/2003 | Horvitz et al. ................. | 709/313 |
| 2005/0273486 A1 | 12/2005 | Keith, Jr. | |
| 2005/0278366 A1 * | 12/2005 | Horvitz et al. ............... | 707/100 |
| 2006/0031250 A1 * | 2/2006 | Henigman et al. ......... | 707/103 R |
| 2006/0053169 A1 * | 3/2006 | Straub et al. .................. | 707/200 |
| 2007/0208690 A1 * | 9/2007 | Schneider et al. ................ | 707/2 |
| 2007/0226196 A1 * | 9/2007 | Adya et al. ......................... | 707/3 |
| 2008/0098173 A1 | 4/2008 | Chidambaran et al. | |
| 2008/0183689 A1 * | 7/2008 | Kubota et al. ..................... | 707/4 |
| 2009/0254589 A1 | 10/2009 | Nair et al. | |
| 2010/0017384 A1 * | 1/2010 | Marinescu ........................ | 707/5 |
| 2010/0299348 A1 * | 11/2010 | Gill et al. ....................... | 707/769 |
| 2011/0264650 A1 * | 10/2011 | Tobin et al. .................... | 707/722 |
| 2012/0221582 A1 * | 8/2012 | Boross et al. .................. | 707/752 |

OTHER PUBLICATIONS

Williams, Mark A., "Use database change notification with ODP.NET and Oracle Database 10g Release 2.", Retrieved at << http://www.oracle.com/technetwork/issue-archive/2006/06-mar/o26odpnet-093584.html >>, Mar. 2006, pp. 4.

"Synchronizing a Local Data Store with Microsoft Outlook", Retrieved at << http://msdn.microsoft.com/en-us/library/aa479346.aspx >>, Jan. 2006, pp. 21.

Dunnington, Aaron, "Build Better Data-Driven Apps with Distributed Caching", Retrieved at << http://msdn.microsoft.com/en-us/magazine/dd861287.aspx >>, Jun. 2009, pp. 12.

"Developing Applications with Database Change Notification", Retrieved at << http://download.oracle.com/docs/cd/B19306_01/appdev.102/b14251/adfns_dcn.htm >>, Retrieved Date: Feb. 22, 2011, pp. 21.

"How to: Configure Data Synchronization in an Application", Retrieved at << http://msdn.microsoft.com/en-us/library/bb384585.aspx >>, Retrieved Date: Feb. 22, 2011, pp. 4.

* cited by examiner

*Primary Examiner* — Tarek Chbouki

(74) *Attorney, Agent, or Firm* — Turk IP Law, LLC

(57) ABSTRACT

Local data caching for views with linked attributes are optimized based on net change notifications. Data requests may be made periodically to a server, each request with a specific set of constraints on timestamps of entity types involved in a view and each ordered by a primary item's identifier (ID). Applying the results of these requests to a client-side cache of the view results enables the client-side cache to stay "relatively fresh" with respect to the server's data. The server may handle view data requests where all conditions on related tables' columns are applied with an "and" operation, and the specific set of conditions on the timestamps of the related items are applied to get the net changes with minimum redundancy. The server may also handle stateless view data requests limited by the number of results, and a "sort by ID" may be applied to ensure consistent results over time.

20 Claims, 6 Drawing Sheets

NET CHANGE NOTIFICATION BASED CACHED VIEWS WITH LINKED ATTRIBUTES

BACKGROUND

Enterprise Resource Planning (ERP) and Customer Relationship Management (CRM) services are bundles of applications that address a wide range of needs in education, distribution, manufacturing, government, healthcare, professional services, and not-for-profit industries. Such services typically include a number of customizable applications executed on a plurality of servers and accessed via a range of networks by client devices and applications. Client applications may be "thin" clients that mostly rely on the service to provide functionality or "rich" clients that include some functionality to process data received from the service.

One of the challenges in building a rich client application is to enable quick manipulation of list data contained in a server view definition. Some approaches include storing a complete view's result set in local cache so that the results can be retrieved and manipulated locally without requiring time consuming server round trips and also avoiding unnecessary server load. The local cache may need to be maintained "relatively fresh" against the actual data on the server. A CRM server servicing the client may have certain limitations on the types of requests it can handle, however. The result set returned may be limited to a certain maximum number of rows, and there may not be a guarantee that the server data does not change between the subsequent requests returning their results. Furthermore, a query may contain conditions on the "primary" table's columns grouped by both "and" and "or" operations, but all conditions on the joined related tables' columns typically have to be grouped by "and".

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to optimizing local data caching for views with linked attributes based on net change notifications. Data requests may be made periodically to a server, each request with a specific set of constraints on timestamps of entity types involved in a view and each ordered by a primary item's identifier (ID). Applying the results of these requests to a client-side cache of the view results enables the client-side cache to stay "relatively fresh" with respect to the server's data. According to some embodiments, the server handles view data requests where all conditions on related tables' columns are applied with an "and" operation, and the specific set of conditions on the timestamps of the related items are applied to get the net changes with minimum redundancy. According to other embodiments, the server may handle stateless view data requests limited by the number of results, and a "sort by ID" may be applied to ensure consistent results over time.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
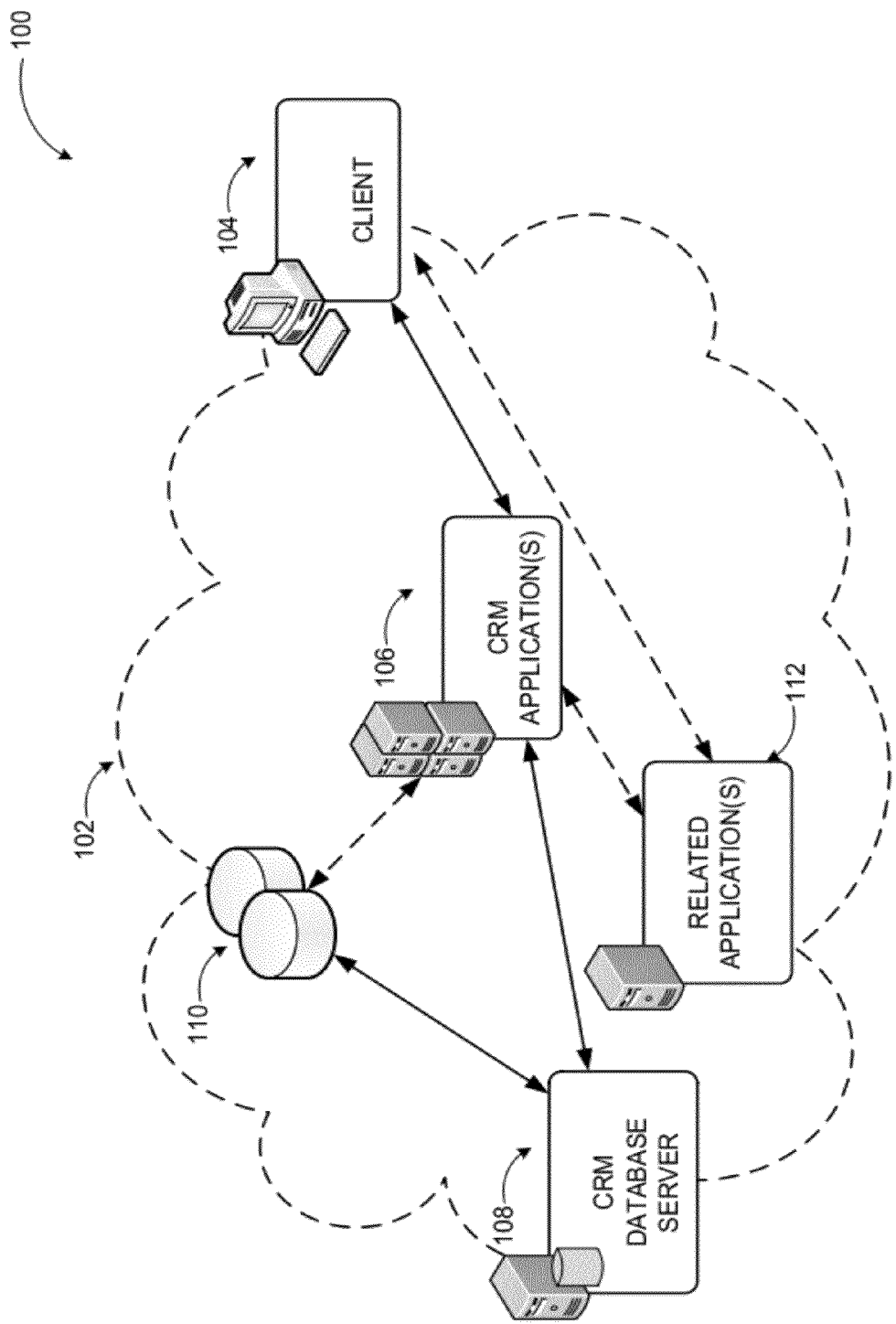
FIG. 1 illustrates an example Customer Relationship Management (CRM) system where cached view with linked attributes may be optimized through net change notification according to embodiments.

As briefly described above, to optimize local view caching a server may handle only view data requests where all conditions on related tables' columns are applied with the "and" operation, and specific set of conditions on the timestamps of the related items may be applied to get the net changes with minimum redundancy. Moreover, the server may handle stateless view data requests limited by the number of results and apply "sort by ID" to ensure consistent results over time. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for networked applications such as CRM applications where portions of server data may be locally cached. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network.

FIG. 1 illustrates an example Customer Relationship Management (CRM) system where cached view with linked attributes may be optimized through net change notification according to embodiments. A system providing CRM services with local caching according to embodiments may be implemented in a variety of configurations and environments. The example environment shown in diagram 100 is a hosted service environment, where distinct servers may be utilized to execute applications for performing individual tasks. The tasks may be performed in a combined manner by fewer or additional applications and/or servers according to other embodiments.

Diagram 100 includes the hosted CRM service provided by a plurality of servers (or clusters), which execute CRM application(s) 106. One or more other servers in the system (or external server) may execute related application(s) 112 such as design applications, workflow applications, analysis applications, and comparable ones and interact with the CRM service. Data store 110 maintaining data related to the CRM service and associated operations may be managed by CRM database server 108 or directly accessed by anyone of the server executing CRM application(s) 106. Access to the CRM service or any of the other applications may be provided through a client application 104.

Client application 104 may be a rich client application installed on the client device providing secure connection to the CRM service. Client application 104 may also be a thin client application such as a browser that enables a user to log in to the CRM service and provide appropriate user interfaces for the user to interact with the service.

A CRM server database may be a relational database whose data model includes a set of entity types where each entity type has a set of attributes and there are some one-to-many relationships between some pairs of entity types. Every entity type may have a primary key "ID" attribute, which is unique and immutable for all objects of that type. Entity types naturally correspond to relational tables, their instances—to rows, attributes—to columns, and a one-to-many relationship is implemented as the ID column in the source entity type table and a foreign key column in the target entity type table.

An atomic condition on an entity type is a condition of form "<attribute> <operation> [<value>]" where <attribute> is an attribute of the entity type, <operation> is a unary or binary operation applicable to the type of that attribute and optional <value> (for binary operators) is a constant of the same type. A condition on an entity type is a combination of atomic conditions using the logical "AND" and/or "OR" operations. There is an obvious natural logical value of a condition for a given instance of the entity type. A server query is defined by its base entity type, filter, column set and sort order. A column set on entity type is a list of attributes belonging to that entity type. A filter of depth 1 on entity type <entityType> can have the following form:

$Condition_0(object)$ [AND $Condition_1(relatedObject_1)$] ... AND $Condition_N(relatedObject_N)$], where $Condition_0$ is a condition on <entityType> and $Condition_i$ is a condition on the target entity type of the one-to-many relationship $relatedObject_i$ whose source entity type is <entityType>. The logical value of this query filter for the given <object> is true if and only if ($Condition_0$ is true for <object> and for each i in [1 ... N], there exists at least one target of the $relatedObject_i$ relationship sourced at <object> for which $Condition_i$ is true).

The result set of the query is the set of rows corresponding to all objects of <entityType> for which the value of the query filter is true, with the set of columns in each row coinciding with the query's column set, all those rows sorted by the query's sort order. A view as used herein is a query, which a user defines and with whose result set wishes to work in the client application. Embodiments provide an efficient approach to keep the cache of the view's result set in sync with the up-to-date server's data considering the possibility of arbitrary updates to all pieces of data.

Figure 2:
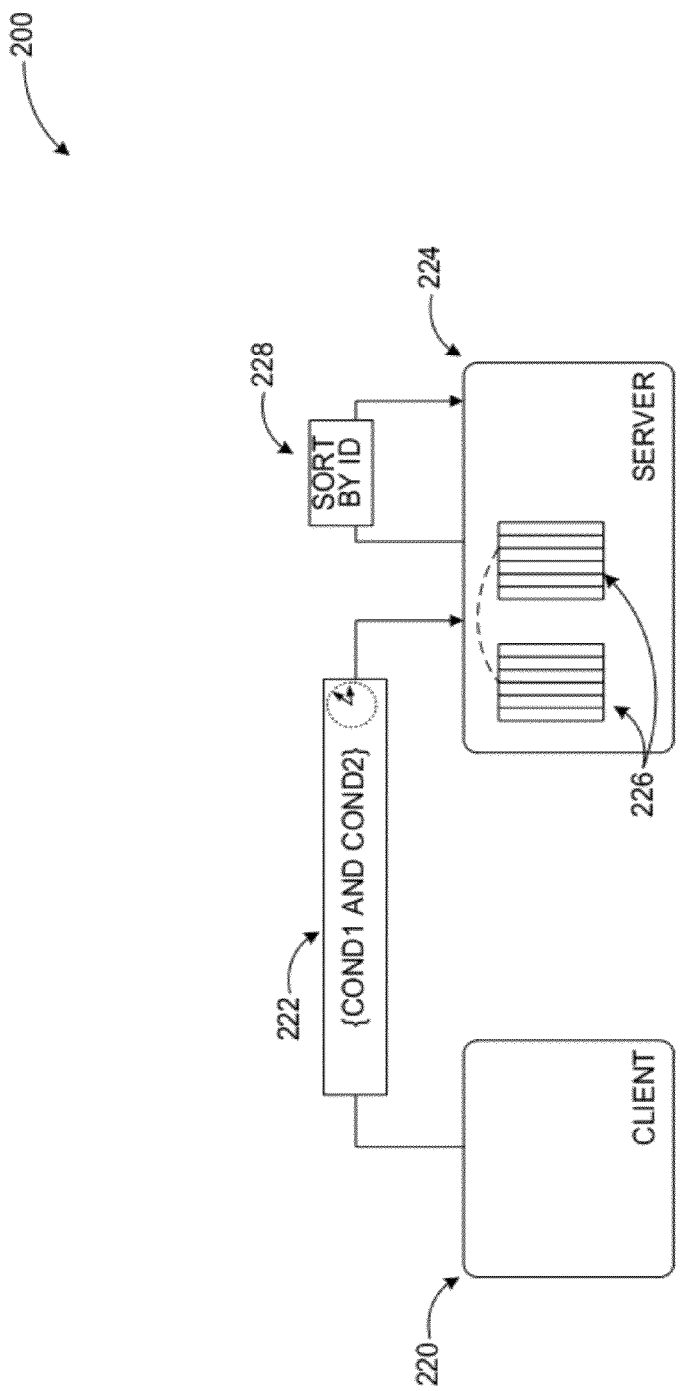
FIG. 2 is a conceptual diagram illustrating combination of conditions on related tables and use of timestamps according to some embodiments.

FIG. 2 is a conceptual diagram illustrating combination of conditions on related tables and use of timestamps according to some embodiments. In a system according to embodiments, the server 224 only handles view data requests where all conditions 222 on related tables' columns 226 are applied with an "and" operation, applying the specific set of conditions on the timestamps of the related items to get the net changes with minimum redundancy. A "sort by ID" 228 is applied on unique and immutable entity type identifiers to ensure consistent results over time. Thus, a series of requests are made periodically from the client 220 to the server 224, each request with a specific set of constraints on the timestamps of the entity types involved in the view and each ordered by the primary item's ID. Applying the results of these requests to the client-side cache of the view results in the client-side cache staying "relatively fresh" with respect to the server's data.

Many entity types in a CRM database may have a "timestamp" attribute, which may be updated to the global MinActiveRowVersion value with every change of any attribute's value. Also, for every query request, the server may return the current MinActiveRowVersion value together with the query's result set. For a view whose definition has no related objects, this allows for an efficient mechanism to formulate a "delta" query that may return the set of net changes for the view's results since the previous query execution, provided the client can get the complete result set of such delta query every time (the client may periodically issue a query of the form "$Condition_0(object)$ AND timestamp(object)>=LastMinActiveRowVersion", merge its result set into the cache of the view's result set and assign LastMinActiveRowVersion to be the MinActiveRowVersion value returned from the query). In a practical implementation, the result set returned for any client query request may be limited by certain maximum number of rows (if the actual result set of the query is larger than that limit, the list of rows returned by the server are truncated accordingly and reported as such). A client may request more data in the next query if the previous result set was incomplete, but there is a possibility that some data changes occur between these requests. Furthermore, the view's filter may have related objects in it.

Figure 3:
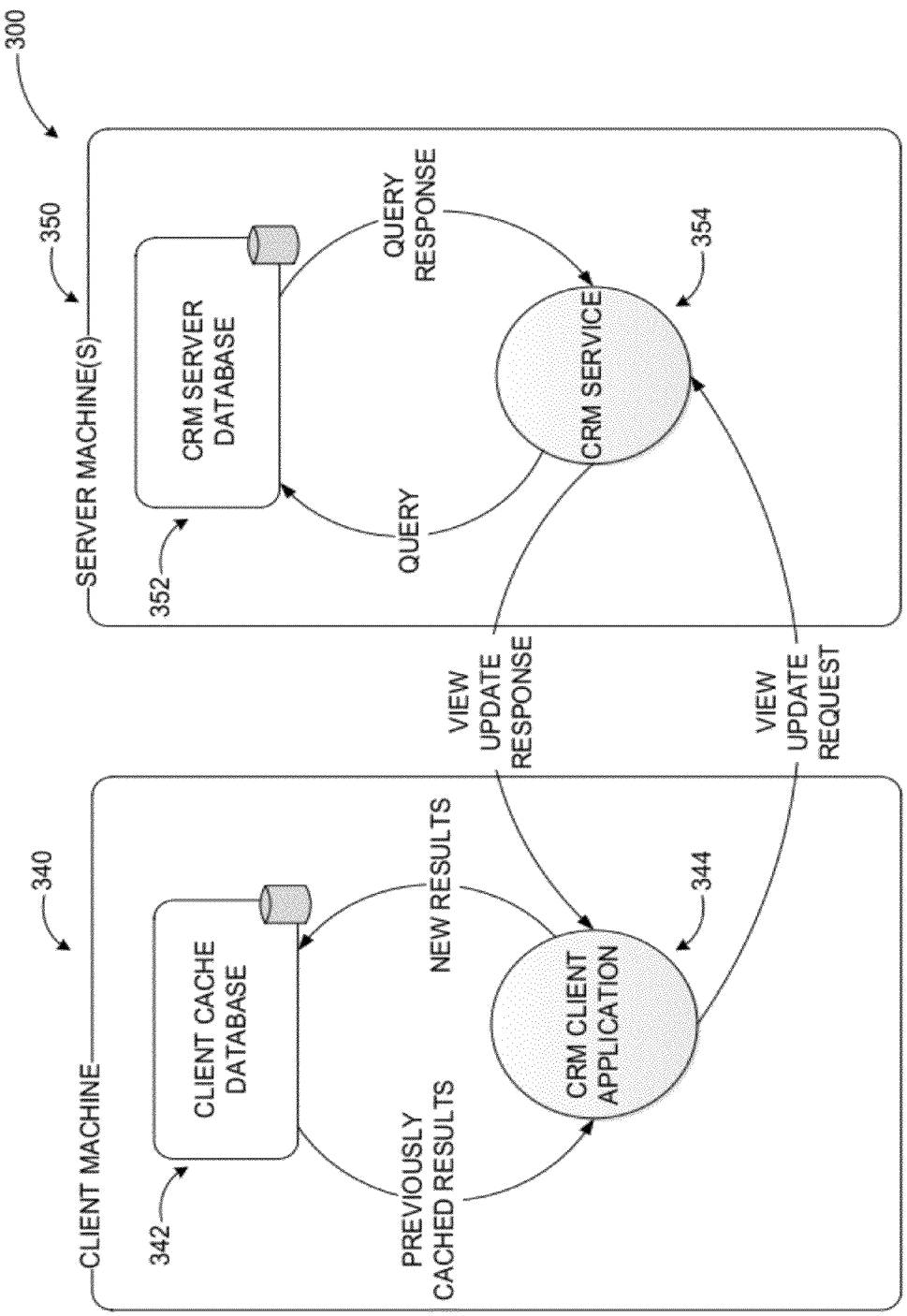
FIG. 3 illustrates example interactions between a client and a server according to embodiments.

FIG. 3 illustrates example interactions between a client and a server according to embodiments. The interactions shown in diagram 300 include retrieval of previously cached results from client cache database 342 by CRM client application 344 executed on client machine 340 and storage of new results at the client cache database 342. CRM client application 344 may send periodic view update requests to CRM service 354 executed on server machine(s) 350 and receive view update responses to keep the client cache database 342 up-to-date. In response to receiving a view update request from CRM client application 344, CRM service 354 may submit a query to CRM server database 352 and receive a query response based on which the view update response may be sent to CRM client application 344.

As mentioned above, the result set returned for any client query request may be limited by certain maximum number of rows, and even if the client requests more data in subsequent queries, data changes occur between these requests. The view's filter may also have related objects in it. To address the challenges, a client in a system according to embodiments may employ a caching algorithm as shown below. In the example algorithm, the variable viewDefinition (of type query) defines the view for which the cache is maintained, resultsCache defines current contents of the view's cache (list of views), and previousMinActiveRowVersion defines the MinActiveRowVersion value for which the last net changes query iteration was valid.

The example algorithm may utilize three functions defined as:

```
1)  MergeResultSetIntoCache(list-of-rows resultSet) (retrives a "complete" result set of
    Q in batches, except for the possibility of missed rows between the batches; returns
    the MinActiveRowVersion of the very first of the batches; the possibly missed rows
    are picked up on the next updates iteration)
    {
        for each <row> in resultSet
        {
        if (resultsCache contains a row with the same ID as <row>)
            update that row with the column values from <row>;
        else
            add <row> to resultsCache;
        }
    }
2)  MergeResults(query Q)
    //   retrieves a "complete" result set of Q in batches, except for the possibility of
         missed rows between the batches; return the MinActiveRowVersion of the
         very first of the batches; the possibly missed rows will be picked up on the
         next updates iteration
    {
        lastID = null;
        long? firstMinActiveRowVersion = null;
        while (true)
        {
            Query Result result = Request(ID(object)>lastID AND Q.filter,
        Q.columnSet);
                MergeResultSetIntoCache(result.rows);
                if (firstMinActiveRowVersion==null)
                    firstMinActiveRowVersion = result.MinActiveRowVersion;
                if (!result.moreRows)
                    break;
                lastID = result.last-row.ID;
        }
        return firstMinActiveRowVersion;
    }
3)  UpdateIteration( )
    {
        query q = viewDefinition.Clone( );
        q.filter = {timestamp(object) >= previousMinActiveRowVersion AND
    viewDefinition.filter};
        previousMinActiveRowVersion = MergeResults(q);
        for (int i = 1 to viewDefinition.filter.relatedConditionsCount)
        q.filter = {timestamp(object) < previousMinActiveRowVersion AND
    viewDefinition.filter.Condition₀ AND
            timestamp(relatedObject₁) < previousMinActiveRowVersion AND
        viewDefinition.filter.Condition₁ AND
            ...
            timestamp(relatedObject_{i-1}) < previousMinActiveRowVersion AND
        viewDefinition.filter.Condition_{i-1} AND
            timestamp(relatedObject_i) >= previousMinActiveRowVersion AND
        viewDefinition.filter.Condition_i AND
            viewDefinition.filter.Condition_{i+1} AND
            ...
            viewDefinition.filter.Condition_N};
        MergeResults(q);
    }
```

Every time UpdateIteration function is called, the resultsCache is updated with newly changed rows. If an object satisfies the view's filter for a sufficiently long period of time (this depends on the frequency of the update iterations and the number of related objects in the filter), the client-side cache will eventually contain a row of "relatively fresh" data for that object. It should be noted that this "cache freshness" property stays true even if the objects keep getting updated very frequently on the server.

For example, if T0 is a moment in time and T1 is the moment when the (N+1)th execution of UpdateIteration( )after T0 finishes, object O on the server satisfies the viewDefinition.filter at every moment in [T0 . . . T1], during the executions of the query requests on the server no writing transactions are pending, then at moment T1, the resultsCache is guaranteed to contain a row corresponding to O with the data coinciding with the row in the server-side result set of viewDefinition for some moment in [T0 . . . T1].

The different processes discussed in FIG. 1 through 3 may be performed at distinct hardware modules, software modules, or combinations of hardware and software. Furthermore, such modules may perform two or more of the processes in an integrated manner using the principles described herein. Furthermore, the algorithm, functions, and variables described above are for illustration purposes only and do not constitute a limitation on embodiments. Other algorithms, functions, and variables may be employed using the principles described herein.

Figure 4:
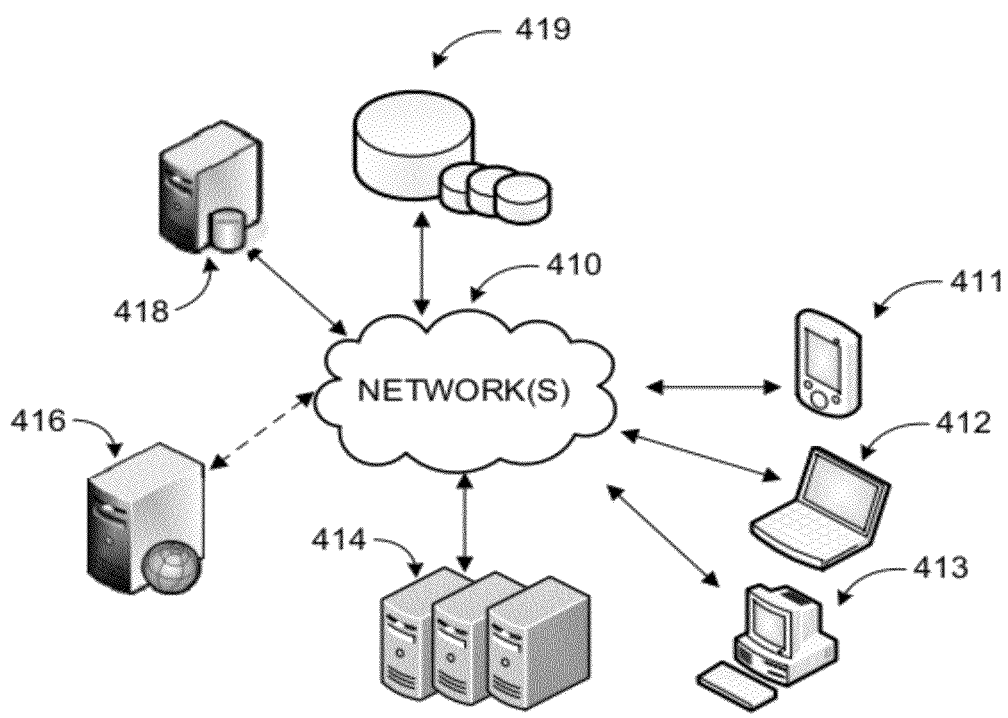
FIG. 4 is a networked environment, where a system according to embodiments may be implemented.

FIG. 4 is an example networked environment, where embodiments may be implemented. A platform for providing net change notification based cached views with linked attributes may be implemented via software executed over one or more servers 414 such as a hosted service. The platform may communicate with client applications on individual client devices such as a smart phone 411, laptop 412, desktop computer 413, or similar devices ('client devices') through network(s) 410.

Client applications executed on any of the client devices 411-413 may interact with a hosted service providing CRM, ERP, or similar services from the servers 414, or on individual server 416. The hosted service may receive periodic requests from client devices, each request with a specific set of constraints on timestamps of entity types involved in a view and each ordered by a primary item's identifier (ID). Applying the results of these requests to a client-side cache of the view results enables the client-side cache to stay "relatively fresh" with respect to the server's data. Relevant data such as CRM data and similar information may be stored and/or retrieved at/from data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also include (especially between the servers and the mobile devices) cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform providing net change notification based cached views with linked attributes. Furthermore, the networked environments discussed in FIG. 4 are for illustration purposes only. Embodiments are not limited to the example applications, modules, or processes.

Figure 5:
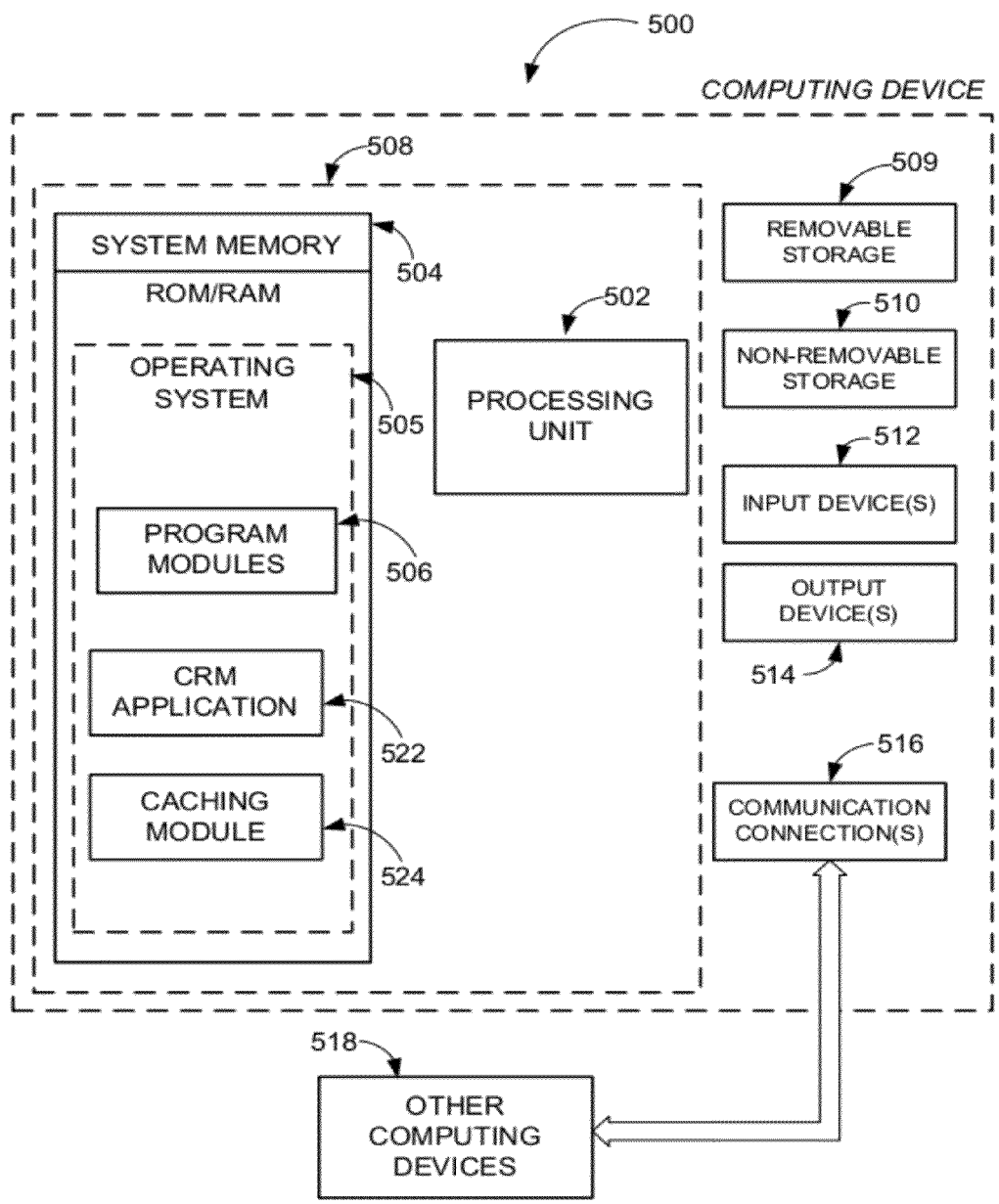
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a client device capable of providing accessing a CRM, ERP, or similar service according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. or similar ones. The system memory 504 may also include one or more software applications such as program modules 506, CRM application 522, and caching module 524.

CRM application 522 may be a client application that enables access to a hosted CRM service for sending/retrieving CRM data, rendering reports, analyses, and performing similar operations. In other embodiments, CRM application 522 may also be a generic application such as a web browser. Caching module 524 may submit requests periodically to a CRM server, each request with a specific set of constraints on timestamps of entity types involved in a view and each ordered by a primary item's identifier (ID). Applying the results of these requests to a client-side cache of the view results enables the client-side cache to stay "relatively fresh" with respect to the server's data as discussed previously. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, other servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
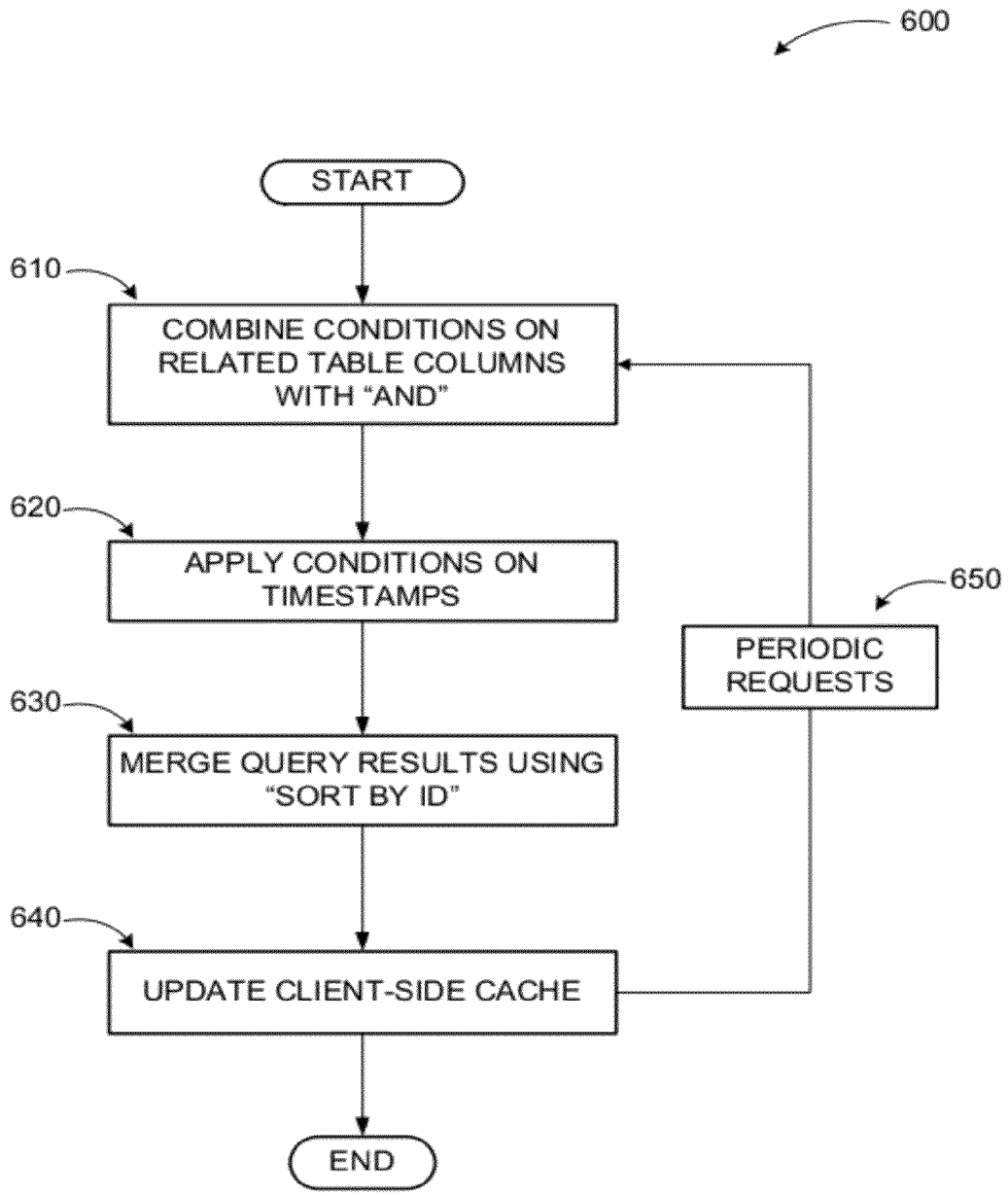
FIG. 6 illustrates a logic flow diagram for a process of optimizing cached views with linked attributes using net change notifications according to embodiments.

FIG. 6 illustrates a logic flow diagram for a process 600 of optimizing cached views with linked attributes using net change notifications according to embodiments. Process 600 may be implemented as part of a CRM, ERP, or similar service.

Process 600 begins with operation 610, where conditions on related tables' columns are applied with an "and" operation for submitting a request to a server in order to update view data at a client. Specific set of conditions may be applied on timestamps of the related items to get the net changes with minimum redundancy at operation 620.

The results of the query based on the request may be merged by applying a "sort by ID" filter to ensure consistent results over time at operation 630, where the ID refers to an ID column. The server database is typically a relational database whose data model includes a set of entity types, where each entity type has a set of attributes and there are some one-to-many relationships between some pairs of entity types. Every entity type may be associated with a primary key "ID" attribute, which is unique and immutable for all objects of that type. Entity types correspond to relational tables, their instances—to rows, attributes—to columns, and a one-to-many relationship may be implemented as the ID column in the source entity type table and a foreign key column in the target entity type table.

At operation 640, the client-side cache of view data may be updated with the received results. The requests may be submitted periodically as shown in operation 650 such that changes to server-side data in between requests can be captured and carried over to the client-side cache.

The operations included in process 600 are for illustration purposes. Net change notification based cached views with linked attributes may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for caching view data with linked attributes based on net change notification, the method comprising:
   submitting a query to a server for the view data, the query including:
      combining conditions on related table columns of server-side view data with an "and" operation;
      applying the combined conditions on timestamp attributes of the related table columns;
   retrieving query results in batches and returning a minimum active row version associated with a first batch from the batches;
   merging the query results by applying a "sort by ID" filter on "ID" attributes that are unique and immutable for objects corresponding to an entity type;
   updating a client-side view data cache based on the merged results;
   in response to at least one of the objects in the server-side view data satisfying a "viewDefinition" filter for a pre-determined period depending on a frequency of updating the client-side view data cache, providing a guarantee that the at least one of the objects coincide with at least one corresponding row in the client-side view data cache; and
   picking up a possible missed row between the batches on a subsequent update of the client-side view data cache.

2. The method of claim 1, wherein the server-side view data is stored in a relational database whose data model includes a set of entity types, and the "sort by ID" filter is applied on a primary key "ID" attribute for each entity type.

3. The method of claim 2, wherein each entity type includes a set of attributes and at least a portion of entity type pairs have one-to-many relationships.

4. The method of claim 3, wherein a column set for each entity type is a list of attributes belonging to that entity type.

5. The method of claim 2, further comprising:
   defining the query by its base entity type, filter, column set and sort order.

6. The method of claim 1, wherein a result set of the query is a set of rows corresponding to objects corresponding to an entity type with a set of columns in each row coinciding with the query's column set and the rows sorted by the query's sort order.

7. The method of claim 6, wherein a value of the query filter is true for the result set.

8. The method of claim 6, wherein a filter depth of the query is one.

9. The method of claim 1, further comprising:
   submitting the query in a periodic manner to capture changes to the server-side view data occurring between queries.

10. The method of claim 1, wherein the query is stateless.

11. A computing device for executing a client application capable of caching view data with linked attributes based on net change notification, the computing device comprising:
   a memory storing instructions; and
   a processor coupled to the memory, the processor executing the client application in conjunction with the stored instructions, wherein the client application is configured to:
      submit periodic queries to a server for the view data, each query arranged to:

combine conditions on related table columns of server-side view data with an "and" operation;
apply the combined conditions on timestamp attributes of the related table columns;
retrieve query results in batches and return a minimum active row version associated with a first batch from the batches;
merge the query results by applying a "sort by ID" filter on a primary key "ID" attribute for each entity type, wherein the server-side view data is stored in a relational database whose data model includes a set of entity types;
update a client-side view data cache based on the merged results in an iterative manner;
in response to objects in the server-side view data satisfying a "viewDefinition" filter for a predetermined period depending on a frequency of update iterations, provide a guarantee that the objects coincide with corresponding rows in the client-side view data cache and indicate a "cache freshness" binary property as true to show the corresponding rows as fresh data and
pick up a possible missed row between the batches on a subsequent update of the client-side view data cache.

12. The computing device of claim 11, wherein the client application is further configured to:
adjust the frequency of update iterations and a number of related objects in a query filter based on objects in desired view data.

13. The computing device of claim 11, wherein each condition on an entity type includes an attribute of the entity type and one of a unary and binary operation applicable to a type of the attribute.

14. The computing device of claim 11, wherein each condition on an entity type is a combination of atomic conditions employing at least one of a logical "and" and a logical "or" operation.

15. The computing device of claim 11, wherein the client application is further configured to one of process, analyze, and render the view data cached on client-side.

16. The computing device of claim 11, wherein the view data is retrieved from one of: a disk, a global assembly cache, and a database.

17. The computing device of claim 11, wherein the client application is associated with one of a customer relationship management (CRM) service and an enterprise resource planning (ERP) service.

18. A computer-readable storage device with instructions stored thereon for caching view data with linked attributes based on net change notification, the instructions comprising:
submitting periodic stateless queries to a server for the view data, each query including:
combining conditions on related table columns of server-side view data with an "and" operation;
applying the combined conditions on timestamp attributes of the related table columns;
retrieving query results in batches and returning a minimum active row version associated with a first batch from the batches;
merging the query results by applying a "sort by ID" filter on a unique and immutable primary key "ID" attribute for each entity type, wherein the server-side view data is stored in a relational database whose data model includes a set of entity types;
updating a client-side view data cache based on the merged results;
in response to objects in the server-side view data satisfying a "viewDefinition" filter for a predetermined period depending on a frequency of updating the client-side view data cache, providing a guarantee that the objects coincide with corresponding rows in the client-side view data cache and indicating a "cache freshness" property as true value to show the corresponding rows as fresh data; and
picking up a possible missed row between the batches on a subsequent update of the client-side view data cache.

19. The computer-readable storage device of claim 18, wherein instances of the entity types corresponding to rows, attributes of the entity types corresponding to columns, and a one-to-many relationship between the entity types are implemented as an ID column in a source entity type table and a foreign key column in a target entity type table.

20. The computer-readable storage device of claim 18, wherein the entity types correspond to relational tables and a column set for each entity type is a list of attributes belonging to that entity type.

* * * * *